(12) United States Patent
Kim (10) Patent No.: US 7,783,595 B2
(45) Date of Patent: Aug. 24, 2010

(54) MOBILE COMMUNICATION TERMINAL FOR DOWNLOADING CONTENTS AND METHOD THEREOF

(75) Inventor: Han-Su Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 720 days.

(21) Appl. No.: 11/499,694

(22) Filed: Aug. 7, 2006

(65) Prior Publication Data

US 2007/0038639 A1 Feb. 15, 2007

(30) Foreign Application Priority Data

Aug. 9, 2005 (KR) .................. 10-2005-0072922

(51) Int. Cl.
*G06F 17/00* (2006.01)
(52) U.S. Cl. .................. 707/609; 707/913; 700/94; 709/234
(58) Field of Classification Search .............. 707/609, 707/913, 999.107, 104.1; 700/94; 709/234
See application file for complete search history.

(56) References Cited

U.S. PATENT DOCUMENTS

| | | | |
|---|---|---|---|
| 6,532,495 B1 * | 3/2003 | Welles et al. | 709/232 |
| 7,457,915 B2 * | 11/2008 | Getzinger | 711/113 |
| 7,555,559 B2 * | 6/2009 | Chapweske | 709/232 |
| 2005/0119936 A1 * | 6/2005 | Buchanan et al. | 705/14 |
| 2005/0172030 A1 * | 8/2005 | Fay | 709/234 |
| 2006/0155400 A1 * | 7/2006 | Loomis | 700/94 |
| 2006/0174160 A1 * | 8/2006 | Kim | 714/18 |
| 2006/0265228 A1 * | 11/2006 | Ando | 705/1 |
| 2007/0280255 A1 * | 12/2007 | Tsang et al. | 370/395.2 |
| 2009/0198358 A1 * | 8/2009 | Logan et al. | 700/94 |
| 2009/0327512 A1 * | 12/2009 | Chapweske | 709/232 |

FOREIGN PATENT DOCUMENTS

| | | |
|---|---|---|
| CN | 1509104 A | 6/2004 |
| JP | 2002-41390 A | 2/2002 |
| JP | 2002-149171 A | 5/2002 |
| JP | 2002-189598 A | 7/2002 |
| JP | 2005-522955 A | 7/2005 |
| KR | 10-2005-0088529 A | 9/2005 |
| WO | 01/08062 A1 | 2/2001 |
| WO | WO 0108062 A1 * | 2/2001 |
| WO | WO2004056067 * | 1/2004 |

* cited by examiner

*Primary Examiner*—Shahid A Alam
*Assistant Examiner*—Alexandria Y Bromell
(74) *Attorney, Agent, or Firm*—Birch, Stewart, Kolasch & Birch, LLP (57) ABSTRACT

A mobile communication terminal for downloading contents and a method thereof. The mobile communication terminal comprises: a memory for storing at least one multimedia data to be outputted while downloading contents; a controller for outputting at least one control signal to control an output of the stored multimedia data when prediction time for downloading the contents is more than a preset time; and at least one output device for outputting the stored multimedia data based on the outputted control signal.

12 Claims, 7 Drawing Sheets

MOBILE COMMUNICATION TERMINAL FOR DOWNLOADING CONTENTS AND METHOD THEREOF

BACKGROUND OF THE INVENTION

1. Field of the Invention

The present invention relates to a mobile communication terminal, and more particularly, to a mobile communication terminal for downloading contents capable of enhancing a user's convenience, and a method thereof.

2. Description of the Background Art

Generally, a mobile communication terminal is a device for wirelessly communicating with another party anywhere and anytime through a switching control by a mobile switching center (MSC) while being carried in a service region defined by a base station (BS). Recently, a mobile communication terminal having a large display device is being actively developed.

The mobile communication terminal is being provided with not only a communication function but also an additional service function for enhancing a user's convenience and a communication utility. A user's preference for the additional service is being increased.

The additional service function includes a wireless internet on-line service function such as an on-line game, a portable internet service, a video on demand (VOD), and a file download; a message function such as a chatting, an instant message, a text message, a multimedia message, and an electronic mail; a calling function such as a voice calling and a video calling; a camera function such as a moving image capturing and a still image capturing; and each kind of additional function such as a scheduler, a telephone directory search, a calculator, a memo note, a communication contents audio-recording, a communication contents video-recording, a terminal state setting, a calendar search, a world time viewing, an alarm setting, a moving image file reproduction, and a music file reproduction.

A user can download not only contents of a small capacity such as an MP3 but also contents of a large capacity such as a music video or a game through the on-line service. When the contents of a small capacity or a large capacity are downloaded, the state of the contents being downloaded is displayed on a display unit of the mobile communication terminal.

However, in the related art mobile communication terminal for downloading contents, when a contents selected by the user is downloaded, only a downloading state of the selected contents is displayed. Therefore, when the selected contents has a large capacity, the user has to wait until the downloading for the contents is completed thereby to have boredom.

SUMMARY OF THE INVENTION

Therefore, an object of the present invention is to provide a mobile communication terminal for downloading contents capable of enhancing a user's convenience by outputting at least one preset multimedia data while downloading contents and thereby efficiently utilizing time taken to wait for the contents downloading to be completed, and a method thereof.

To achieve these and other advantages and in accordance with the purpose of the present invention, as embodied and broadly described herein, there is provided a mobile communication terminal for downloading contents, comprising: a memory for storing at least one multimedia data to be outputted while downloading contents; a controller for outputting at least one control signal to control an output of the stored multimedia data when a prediction time for downloading the contents is more than a preset time; and at least one output device for outputting the stored multimedia data based on the outputted control signal.

To achieve these and other advantages and in accordance with the purpose of the present invention, as embodied and broadly described herein, there is also provided a method for downloading contents in a mobile communication terminal, comprising: storing at least one multimedia data to be outputted while downloading contents; outputting at least one control signal to control an output of the stored multimedia data when a prediction time for downloading the contents is more than a preset time; and outputting the stored multimedia data based on the at least one outputted control signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, will be explained a mobile communication terminal for downloading contents capable of enhancing a user's convenience by outputting at least one preset multimedia data while downloading contents and thereby efficiently utilizing time taken to wait for the contents downloading to be completed, and a method thereof.

Figure 1:
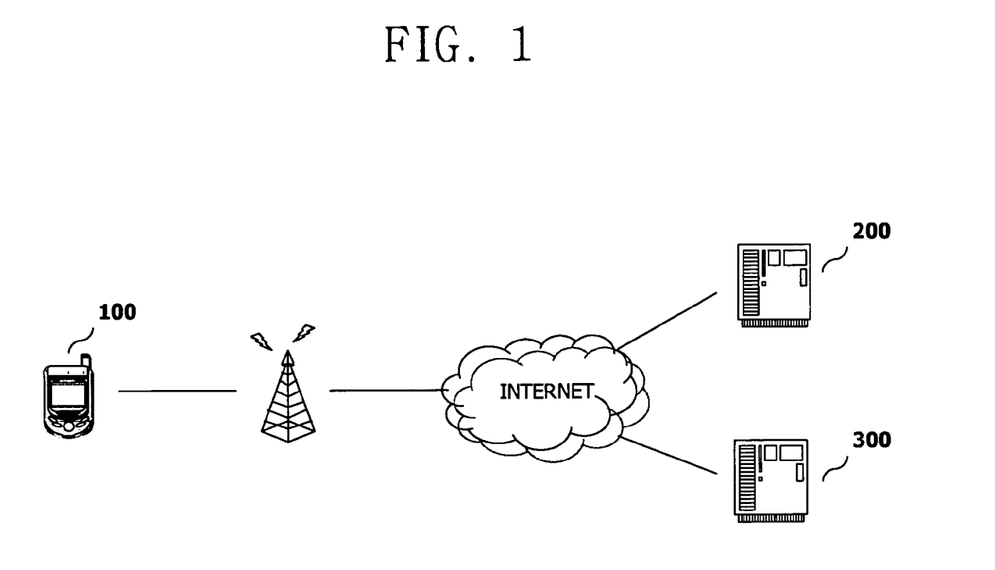
FIG. 1 is a view showing a construction of a mobile communication system for providing contents according to the present invention.

FIG. 1 is a view showing a construction of a mobile communication system for providing contents according to the present invention.

As shown, a mobile communication system for providing contents according to the present invention comprises: a mobile communication terminal 100 for downloading contents and outputting at least one preset multimedia data; a web server 200 connected to the mobile communication terminal 100 through a wireless internet network; and a download server 300 for providing contents corresponding to information selected by a user among each information to be provided to the mobile communication terminal.

The mobile communication terminal 100 outputs at least one preset multimedia data at the time of downloading the contents, and will be explained with reference to FIG. 2.

Figure 2:
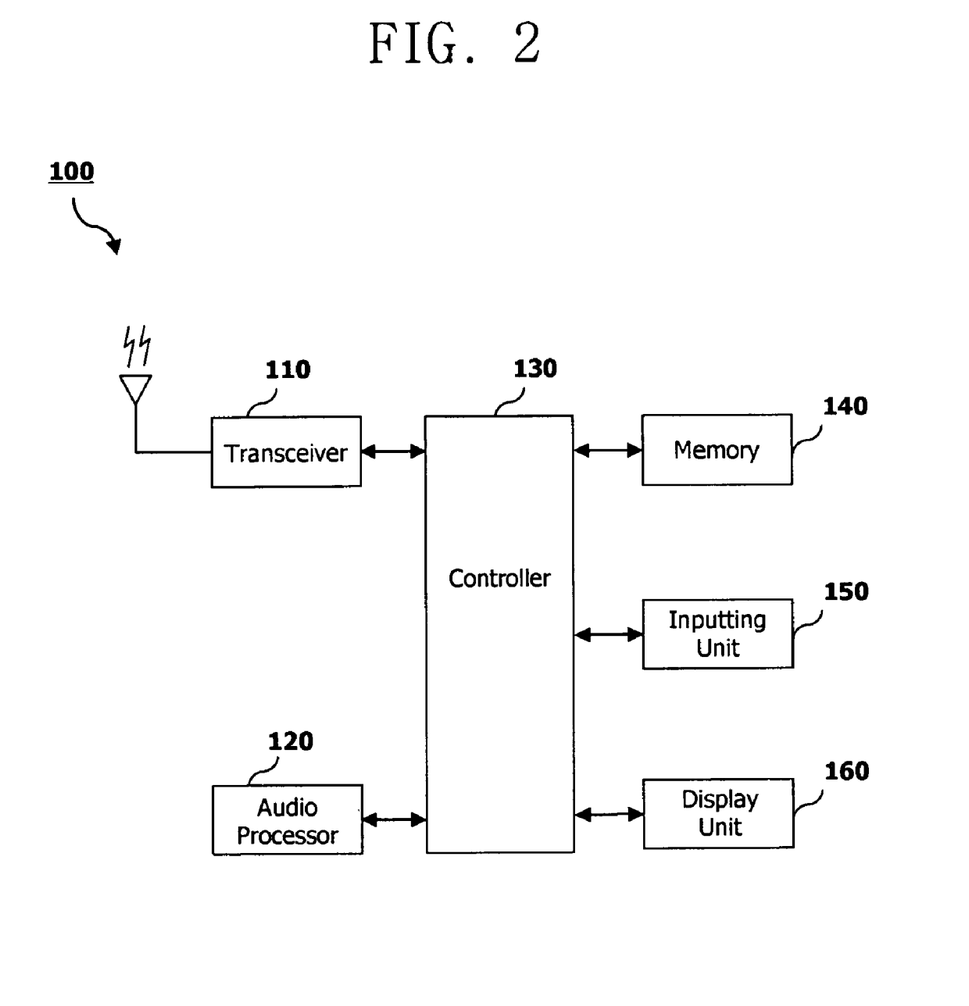
FIG. 2 is a view showing a construction of a mobile communication terminal for downloading contents according to the present invention.

FIG. 2 is a view showing a construction of a mobile communication terminal for downloading contents according to the present invention.

As shown, the mobile communication terminal for downloading contents according to the present invention comprises a transceiver 110, an input unit 150, a memory 140 for storing at least one preset multimedia data to be outputted while downloading contents, a controller 130 for outputting at least one control signal to control an output of the stored multimedia data when a prediction time for downloading the contents is more than a preset time, an audio processor 120 for outputting audio data according to a first control signal, and a display unit 160 for outputting at least one data corresponding to the outputted audio data among text data, image data, and video data on a preset region according to a second control signal.

A method for downloading contents in the mobile communication terminal according to the present invention will be explained with reference to FIGS. 3A and 3B.

Figure 3A:
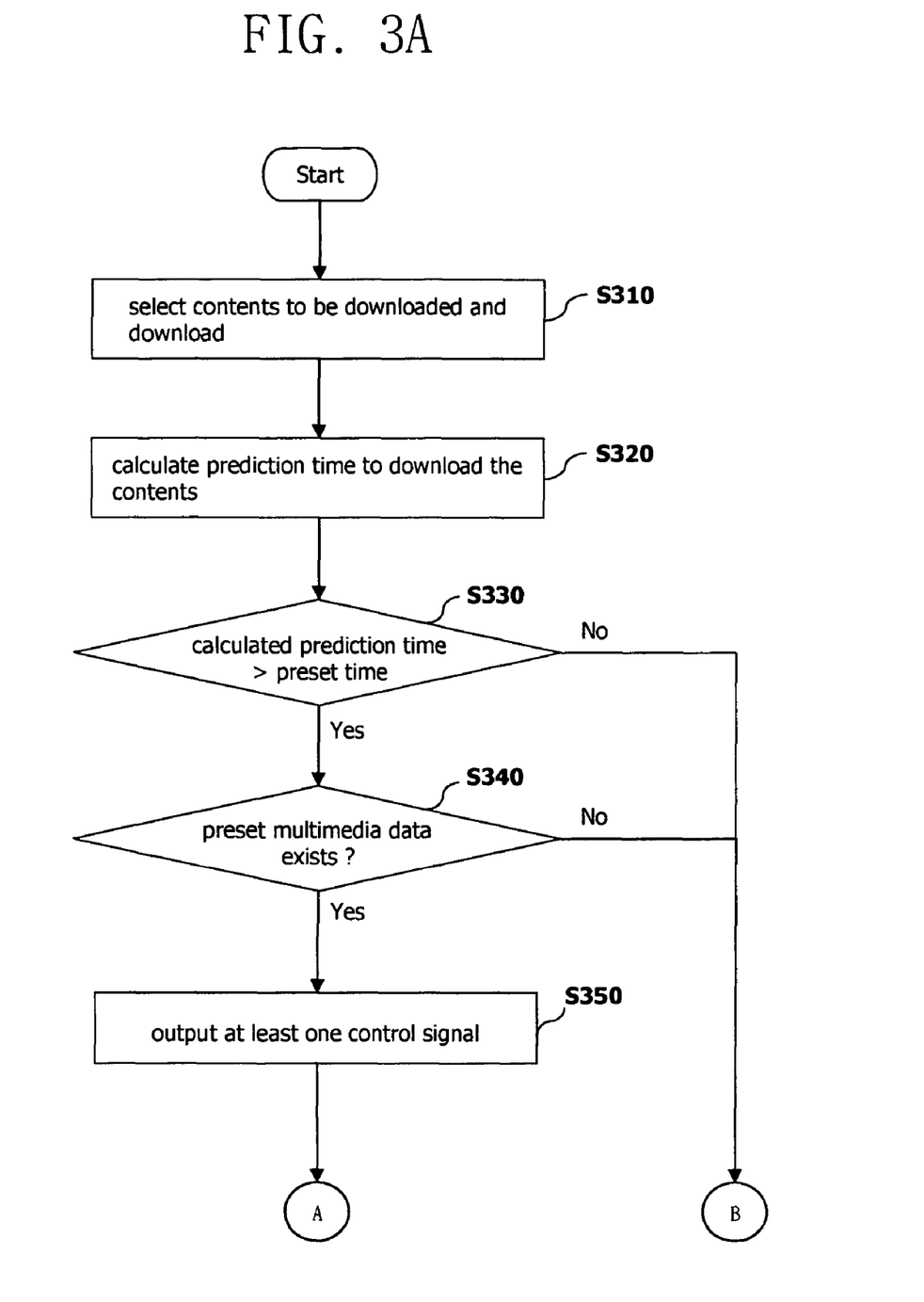
FIGS. 3A and 3B are flowcharts showing a method for downloading contents in the mobile communication terminal according to the present invention.
Figure 3B:
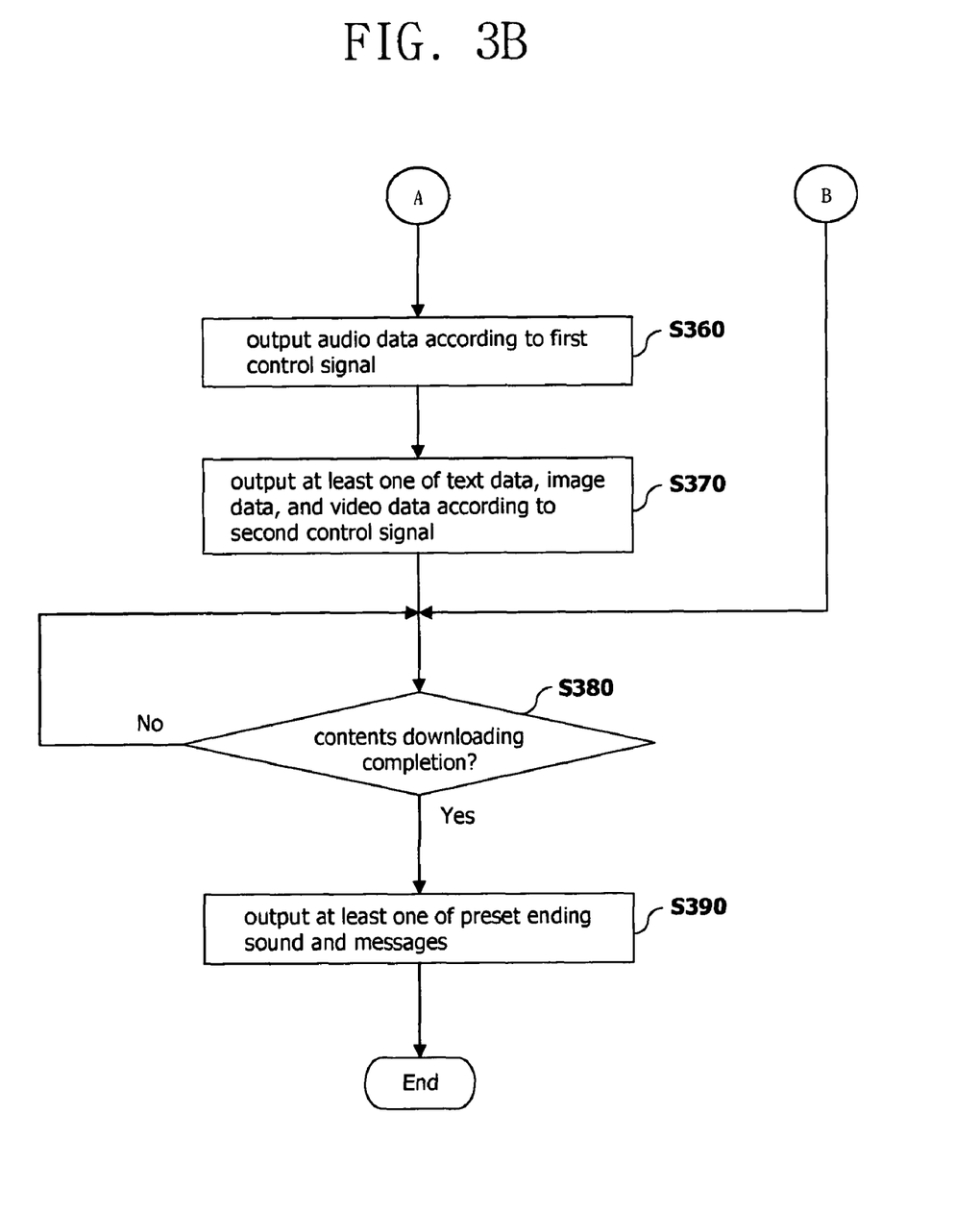

FIGS. 3A and 3B are flowcharts showing a method for downloading contents in the mobile communication terminal according to the present invention.

As shown, the method for downloading contents in the mobile communication terminal according to the present invention comprises selecting contents to be downloaded by a user thereby downloading the selected contents (S310); calculating a prediction time taken to download the contents (S320); comparing the calculated prediction time with a preset time (S330); when the prediction time is more than the preset time, judging whether preset multimedia data to be outputted while downloading the contents exists (S340); when the multimedia data exists, outputting at least one control signal (S350); outputting audio data according to a first control signal (S360); outputting at least one data corresponding to the outputted audio data among text data, image data, and video data according to a second control signal (S370); certifying whether the downloading for the contents has been completed (S380); when the downloading for the contents has been completed, ending the output of the multimedia data and outputting at least one of preset ending sound and messages (S390).

The method for downloading contents in the mobile communication terminal according to the present invention will be explained in more detail.

First, the mobile communication terminal 100 pre-stores at least one multimedia data to be outputted while downloading contents in the memory 140 as a group unit. The multimedia data can include audio data, video data, text data, and image data. An operation for setting a group including at least one multimedia data will be explained with reference to FIG. 4.

Figure 4:
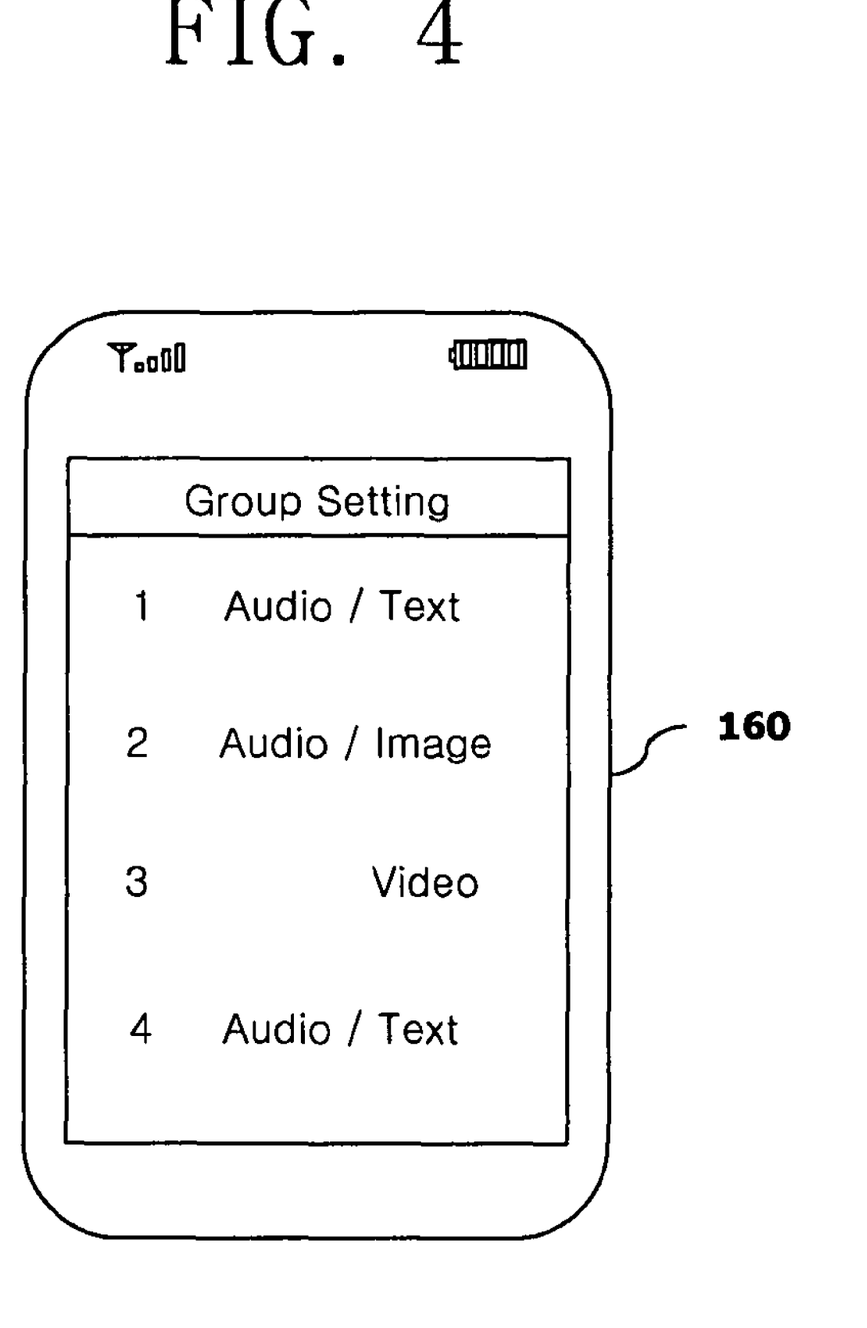
FIG. 4 is an exemplary view showing a principle for setting a group including multimedia data according to the present invention.

FIG. 4 is an exemplary view showing a principle for setting a group including multimedia data according to the present invention.

As shown, the mobile communication terminal according to the present invention can set at least one group through a group setting menu. The group can include at least one multimedia data. For instance, a first group includes audio and text data, a second group includes audio and image data, a third group includes video data, and a fourth group includes audio and text data.

The mobile communication terminal can output said at least one group set through a group setting menu in various manners. The mobile communication terminal can output the set groups sequentially or at random, or can output the set groups selectively according to a prediction time taken to download the contents. For instance, when a prediction time taken to download the contents is less than 1 hour, the mobile communication terminal can set the first group, the second group, and the fourth group to be outputted. On the contrary, when the prediction time taken to download the contents is more than 1 hour, the mobile communication terminal can set the fourth group including video data requiring a relatively long reproduction time to be outputted.

The controller 130 connects to the web server 200 through a wireless internet network by a user, and selects contents to be downloaded among information provided from the download server 300 thus to download the selected contents (S310).

The controller 130 calculates a prediction time taken to download the contents (S320), and compares the calculated prediction time with a preset time (S330). For instance, the controller 130 can calculate a prediction time taken to download the contents based on a data rate. Herein, the preset time is pre-set by the user.

When the prediction time is more than the preset time, the controller 130 judges whether preset multimedia data to be outputted while downloading the contents exists (S340). On the contrary, when the prediction time is less than the preset time, the controller 130 continues to download the contents and the display unit 160 displays a downloading rate of the contents.

When the multimedia data exists, the controller 130 outputs at least one control signal (S350). For instance, when audio data exists, the controller 130 outputs a first control signal for controlling the audio processor 120. When video data, text data, or image data exists, the controller 130 outputs a second control signal for controlling the display unit 160.

The audio processor 120 outputs the audio data according to the first control signal (S360), and the display unit 160 outputs at least one of the text data, the image data, and the video data at a preset region according to the second control signal (S370). Preferably, the display unit 160 outputs at least one among the text data, the image data, and the video data at an upper portion thereof, and outputs a downloading rate of the contents at a lower portion thereof.

The display unit 160 can output the multimedia data as various forms. The text data, the image data, or the video data can be outputted without displaying a downloading rate of the contents, thereby maximizing a visual effect.

Hereinafter, an operation for downloading contents will be explained with reference to FIGS. 5A and 5B.

Figure 5A:
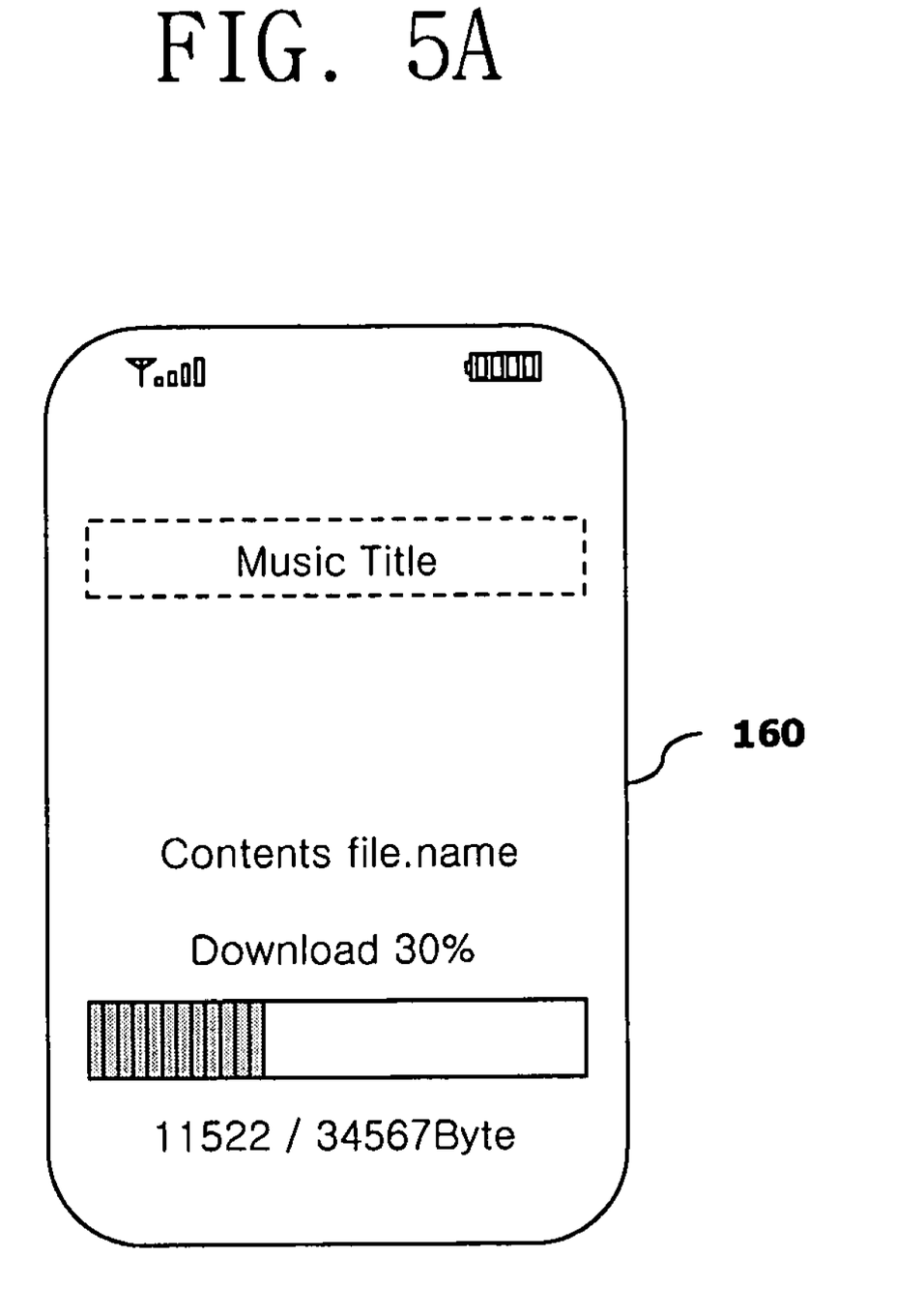
FIGS. 5A and 5B are exemplary view showing an operation of downloading contents according to the present invention.
Figure 5B:
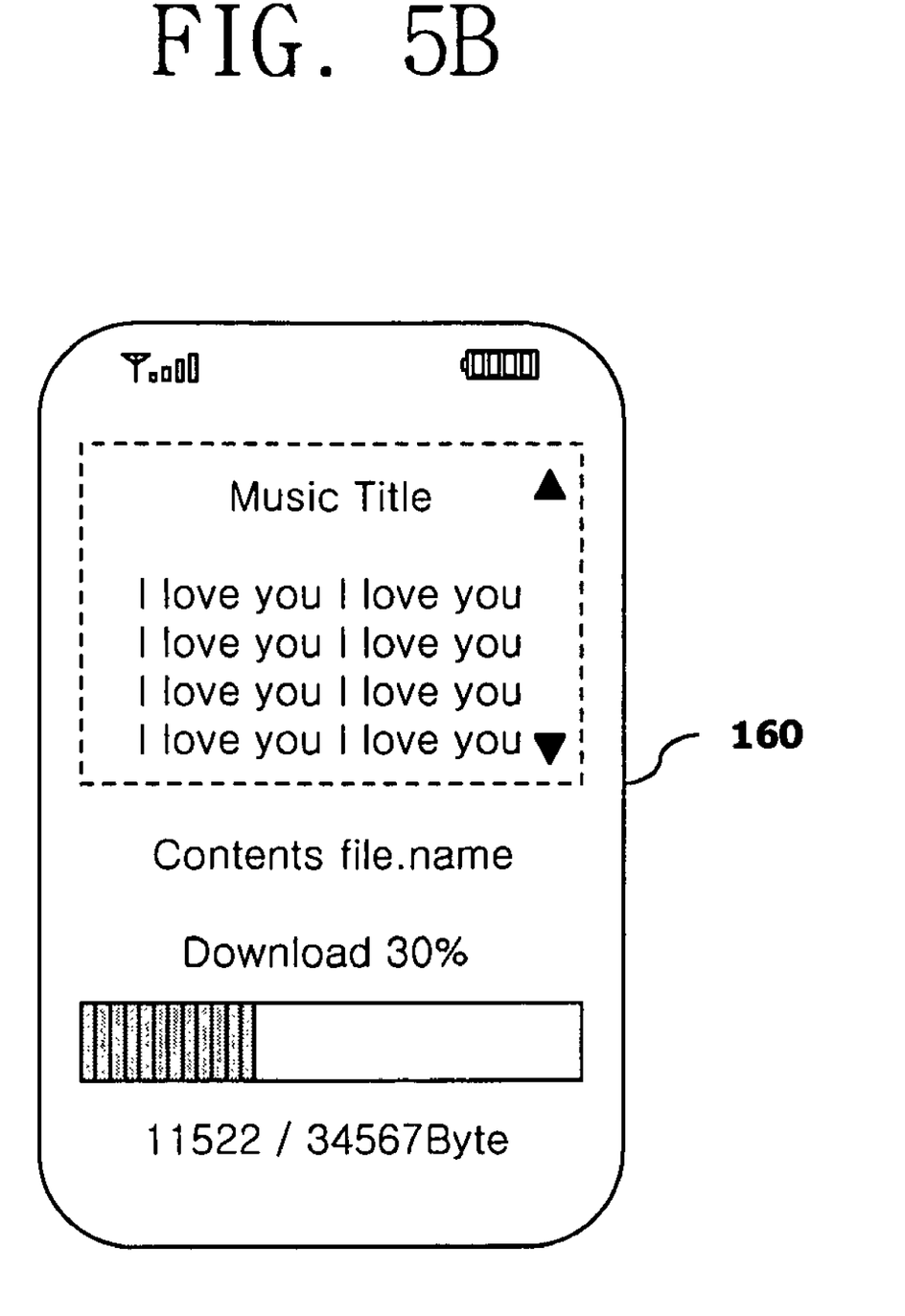

FIGS. 5A and 5B are exemplary view showing an operation of downloading contents according to the present invention.

As shown, the mobile communication terminal 100 outputs audio data through the audio processor 120, and outputs text data corresponding to the audio data such as a song title or song words through the display unit 160.

The mobile communication terminal 100 according to the present invention can output audio data through the audio processor 120, and can output not only text data but also image data such as photos or video data such as moving images corresponding to the audio data.

Then, the controller 130 certifies whether the downloading for the contents has been completed (S380). When the downloading for the contents has been completed, the output of the multimedia data is ended, and at least one of preset ending sound and messages is outputted (S390). The step S390 is performed in order to inform the user that the contents downloading has been completed even from a long distance. The ending sound and the messages can be outputted as various forms.

The controller 130 can store a group including multimedia data of which output has been ended while the contents downloading is performed, and then can perform an output from the stored group. For instance, assuming that outputs for the first, second, and third groups have been completed and an output for the fourth group has been ended while the contents downloading is performed in FIG. 4, the contents are downloaded from the fourth group.

As aforementioned, in the mobile communication terminal for downloading contents and the method thereof, at least one preset multimedia data is outputted while contents are downloaded. As the result, the time taken to wait for the contents downloading to be completed can be efficiently utilized, thereby enhancing the user's convenience.

The present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communication terminal configured to download contents from a remote device, comprising:
   a memory configured to store multimedia data;
   a controller configured to output at least one control signal, while downloading contents, to control an output of the stored multimedia data when a predicted time for downloading the contents is more than a preset time,
   wherein the preset time is pre-determined by a user; and
   at least one output device configured to output the stored multimedia data based on the outputted at least one control signal,
   wherein the multimedia data is stored in the memory prior to downloading the contents,
   wherein the stored multimedia data includes at least two groups of multimedia data,
   wherein the controller is configured to control the at least two stored groups to be outputted sequentially,
   wherein the at least two groups of multimedia data includes a first group of audio data and a second group of video data, text data, or image data,
   wherein at least one output device configured to output the audio data according to a first control signal of the at least one control signal, or output at least one of text data, image data, or video data according to a second control signal of the at least one control signal, and
   wherein the controller is configured to calculate the predicted time to download the contents by comparing a difference between a download start time and a predicted download end time, and
   wherein the contents downloading has been completed, the controller is configured to end the output of the stored multimedia data and output at least one of a preset ending sound and a preset message.

2. The mobile communication terminal of claim 1, wherein the controller is configured to store a group of the at least two groups of multimedia data of which output has been ended while the contents downloading is performed, and then output the stored group of multimedia data of which output has been ended.

3. The mobile communication terminal of claim 1, wherein the output device includes at least one of:
   an audio processor configured to output the audio data; and
   a display unit configured to output the at least one of the text data, image data, and video data according to a second control signal.

4. The mobile communication terminal of claim 3, wherein the display unit is configured to output the at least one of the text data, the image data, and the video data at an upper portion of the display unit, and output a downloading rate of the contents at a lower portion of the display unit.

5. The mobile communication terminal of claim 1, wherein the mobile communication terminal includes a portable phone, a personal digital assistant, a notebook, a portable multimedia player.

6. The mobile communication terminal of claim 1, wherein the controller is configured to
   determine if the predicted time is less than or greater than the preset time,
   while downloading the contents, continue to download the contents when the prediction time is less than the preset time, and
   display a corresponding downloading rate of the contents.

7. The mobile communication terminal of claim 1, wherein the at least one control signal comprises:
   the first control signal when the content includes the audio data; and
   the second control signal when the content includes the at least one of the video data, text data, or image data.

8. A method for downloading contents from a remote device by a mobile communication terminal, comprising:
   storing multimedia data prior to downloading contents;
   while downloading the contents, outputting at least one control signal to control an output of the stored multimedia data when a predicted time for downloading the contents is more than a preset time,
   wherein the preset time is pre-determined by a user; and
   outputting the stored multimedia data based on the at least one outputted control signal,
   wherein the multimedia data includes at least two groups of multimedia data, and
   wherein the step of outputting the stored multimedia data comprises:
      outputting the at least two stored groups sequentially,
   wherein the at least two groups of multimedia data includes a first group of audio data and a second group of video data, text data, or image data,
   wherein the step of outputting the stored multimedia data includes at least one of:
      outputting the audio data according to a first control signal of the at least one control signal; and
      outputting at least one of the text data, image data, and video data according to a control signal of the at least one control signal,
   the method further comprising:
   calculating the predicted time to download the contents by comparing a difference between a download start time and a predicted download end time;
   ending the output of the stored multimedia data; and
   outputting at least one of preset ending sound and messages when the contents downloading has been completed.

9. The method of claim 8, storing a group of the at least two groups of multimedia data of which output has been ended while the contents downloading is performed; and
   outputting the stored group of multimedia data of which output has been ended.

10. The method of claim 8, wherein the step of outputting at least one control signal comprises:
when the predicted time is more than the preset time, judging whether preset multimedia data to be outputted during the contents downloading exists.

11. The method of claim 8, further comprising:
determining if the predicted time is less than or greater than the preset time;
while downloading the contents, continuing to download the contents when the prediction time is less than the preset time; and
displaying a corresponding downloading rate of the contents.

12. The method of claim 8, wherein the at least one control signal comprises:
the first control signal when the content includes the audio data; and
the second control signal when the content includes the at least one of the video data, text data, or image data.

* * * * *